US012475866B2

(12) United States Patent
Li

(10) Patent No.: US 12,475,866 B2
(45) Date of Patent: Nov. 18, 2025

(54) HARMONICA REED PLATE AND HARMONICA

(71) Applicant: Kuiliang Li, Shanghai (CN)

(72) Inventor: Kuiliang Li, Shanghai (CN)

( * ) Notice: Subject to any disclaimer, the term of this patent is extended or adjusted under 35 U.S.C. 154(b) by 228 days.

(21) Appl. No.: 18/447,327

(22) Filed: Aug. 10, 2023

(65) Prior Publication Data

US 2023/0386432 A1 Nov. 30, 2023

(30) Foreign Application Priority Data

Jun. 13, 2022 (CN) ......................... 202221468618.7

(51) Int. Cl.
*G10D 9/035* (2020.01)
*G10D 7/14* (2020.01)

(52) U.S. Cl.
CPC ............... *G10D 9/035* (2020.02); *G10D 7/14* (2020.02)

(58) Field of Classification Search
CPC ................................ G10D 9/035; G10D 7/14
See application file for complete search history.

(56) References Cited

U.S. PATENT DOCUMENTS 2,373,129 A * 4/1945 Magnus .................. G10D 7/14 84/363
2,473,210 A * 6/1949 Magnus .................. G10D 7/14 84/376 R
5,377,574 A * 1/1995 Lempke .................. G10D 7/14 216/100
6,359,204 B2 * 3/2002 Antaki .................... G10D 7/14 84/378
8,847,050 B1 * 9/2014 Sardo ...................... G10D 7/14 84/377
2002/0000154 A1 1/2002 Antaki
2002/0069745 A1 6/2002 Antaki
2013/0036894 A1 2/2013 Bibollet
2018/0204545 A1 * 7/2018 Pearce .................... G10D 7/15
2023/0386432 A1 * 11/2023 Li ........................... G10D 7/14

* cited by examiner

*Primary Examiner* — Robert W Horn
(74) *Attorney, Agent, or Firm* — Zhigang Ma

(57) ABSTRACT

The present invention discloses a harmonica reed plate and a harmonica, and belongs to the field of musical instruments. The harmonica reed plate has different thicknesses by controlling reed slots. Specifically, a groove with fixed depth is milled on the opposite surface of the target reed slot for fixing the reeds so that the reeds obtain an optimal vibration thickness different from the thickness of the original material after fixation to customize an equivalent reed plate thickness for each reed slot (reed) without the need to select a compromised thickness to take into account all the reed slots like the traditional harmonica reed plate. The harmonica prepared by the above harmonica reed plate can realize the optimal vibration mode of bass and treble at the same time on one reed plate, and can control the deviation of timbre, volume and pitch, which is more conducive to playing.

19 Claims, 3 Drawing Sheets

HARMONICA REED PLATE AND HARMONICA

TECHNICAL FIELD

The present invention belongs to the technical field of musical instruments, and particularly relates to a harmonica reed plate and a harmonica.

BACKGROUND

A harmonica is a small wind instrument, and is a multi-reed musical instrument that makes sound by blowing or inhaling air to vibrate metal reeds. According to the sounding modes, it can be classified into two kinds: single-reed sounding and multi-reed sounding. Chromatic harmonicas and blues harmonicas belong to single-reed sounding, while polyphonic harmonicas, chord harmonicas and bass harmonicas belong to multi-reed sounding.

The existing harmonica structure mainly includes grids, a reed plate (as shown in FIG. 1) and reeds, and the reed plate is provided with reed slots corresponding to the reeds. The correspondence means that each reed is fixed on a surface of the reed plate and covers part or all of the reed slots. When playing, the air passes through the surfaces of the reeds so that the reeds vibrate in the reed slots to sound different tones. The vibration amplitude of the reeds is related to the depth of the reed slots, and the depth of the reed slots refers to the thickness of the perforated reed plate corresponding to the reed slot. In order to achieve a better vibration effect, a longer reed usually needs a deeper reed slot depth, that is, the thickness of the perforated reed plate is thicker, and conversely, a shorter reed needs a shallower reed slot depth, that is, the thickness of the perforated reed plate is thinner. However, at present, the harmonica reed plate on the market is usually made by stamping a copper plate with uniform thickness, and the reed plate is perforated to form a reed slot. Therefore, each reed slot has the same depth and each reed plate has the same thickness. This harmonica reed plate has only one reed slot depth, and is impossible to control the corresponding reed slot depth for each tone (that is, the reed). This depth will make a short or long reed in a non-optimal vibration mode, resulting in deviations in timbre, volume and pitch and difficulty to control.

German HOHNER company has produced a chromatic harmonica (old Super64x), which superposed an identical reed plate on part of the reed plate with ordinary thickness (1.0 mm). The reed slot penetrates through two reed plates, so that the corresponding reed slot depth of this part of the reed is doubled, so as to adjust different depths of the reed slots corresponding to the reeds. However, the disadvantage of this design is that the accuracy of secondary processing is difficult to grasp, poor air tightness may be caused, and at most, only two corresponding reed plate thicknesses can be achieved on a harmonica, that is, it is still the thickness after the compromise.

SUMMARY

1. Problem to be Solved

The present invention provides a harmonica reed plate with respect to the problem that a short or long reed is in a non-optimal vibration mode due to the simple reed slot depth on the current reed plate. The harmonica reed plate comprises reed slots and grooves corresponding to the reed slots. Firstly, the thickness of the reed plate corresponding to (covering) the groove is thinned through the arrangement of the groove, and then a reed slot that penetrates through the reed plate is arranged in the groove, so that the depths of the reed slots (that is, the thicknesses of the perforated reed plates) are different. When the harmonica is prepared, the reed corresponding to the reed slot is fixed on the other surface of the groove arranged on the reed plate. When playing, the reed vibrates in the reed slot, and the vibration effect is related to the depth of the reed slot. Therefore, the depth of the reed slot can be controlled according to the length of the reed by controlling the depth of the groove, so that the reed achieves the optimal vibration effect.

2. Technical Solution

To solve the above technical problems, the present invention adopts the following technical solution:

The present invention provides a harmonica reed plate; a plurality of reed slots and a plurality of grooves connected with the reed slots and perforating the reed plate are arranged on the reed plate along a length direction; the plurality of reed slots are arranged alternately on an upper surface and a lower surface of the reed plate successively; the grooves are arranged on back surfaces of the reed slots; and the width of the reed slots is less than the width of the grooves. Through the arrangement of the grooves, the thickness of the reed plate covered by the grooves is thinned, and then the depth of the reed slots, that is, the thickness of the reed plate that is perforated to form the reed slots, is thinned. During use, according to the different lengths of reeds, the depth of the reed slots corresponding to the reeds is controlled by controlling the corresponding groove depth to improve the vibration effect of the reeds, and the optimal vibration mode of bass and treble can be achieved on one reed plate at the same time, without the need to select a compromised thickness to take into account all sound holes like the traditional harmonica reed plate.

Preferably, the length of the reed slots is the same as the length of the grooves, that is, the reed slots and the grooves are overlapped in the width direction of the reed plate, and the width of the reed slots is less than the width of the grooves in the length direction. At this time, the thickness of the reed plate perforated to form the reed slots is the thickness of the reed plate minus the depth of the grooves. By controlling the depth of the grooves, the depth of the reed slots can be controlled to match with the reeds of different lengths.

Preferably, the length of the reed slots is less than the length of the grooves, and at this time, the reed slots as a whole are located in the grooves.

Preferably, the width of the grooves is wider than the width of the reed slots by 0.1 to 1 mm.

Preferably, as the length of the reed slots on the reed plate is decreased, the corresponding groove depth is gradually increased.

Preferably, the number of the reed slots is 10, 12, 24, 28 or 32.

Preferably, the number of the reed slots is 32.

Preferably, the thickness of the reed plate is 1.2 to 2.6 mm.

Preferably, the thickness of the reed plate is 2 mm.

Preferably, the width of the reed slots is 2.1 mm; the width of the grooves 3 is 2.3 mm; the number of the reed slots 2 is 32; the lengths of the reed slots 2 are successively 22, 22, 21, 21, 20.2, 20.2, 19.5, 19.5, 19.5, 19.5, 18.5, 18.5, 17.5, 17.5, 16.5, 16.5, 15.2, 15.2, 14, 14, 13.2, 13.2, 12, 12, 11, 11, 10, 10, 8.8, 8.8, 7.9 and 7.9 mm; and the depths of the grooves 3 are successively 0, 0, 0.1, 0.1, 0.2, 0.2, 0.3, 0.3, 0.3, 0.3, 0.4, 0.4, 0.5, 0.5, 0.6, 0.6, 0.6, 0.6, 0.7, 0.7, 0.8, 0.8, 0.9, 0.9, 0.9, 0.9, 1.0, 1.0, 1.0, 1.0, 1.0 and 1.0 mm.

Preferably, the present invention further provides a preparation method of the harmonica reed plate, which mills a groove with fixed depth on a thickened reed plate according to set parameters through a CNC technology, and conducts 3D processing by CNC to achieve a special shape.

Preferably, the thickened reed plate is completed by a 2D procedure of stamping or wire cutting.

The present invention provides a harmonica, which adopts the harmonica reed plate, and further comprises reeds and grids. The reeds correspond to the reed slots and are fixed on the other surface of the grooves arranged on the reed plate.

Preferably, the reeds are fixed by welding, rivets or screws.

3. Beneficial Effects

Compared with the prior art, the present invention has the following beneficial effects:

(1) In the harmonica reed plate provided by the present invention, a groove with fixed depth is milled on the opposite surface of the reed slot for fixing the reeds on the harmonica reed plate so that the reeds obtain an optimal vibration thickness different from the thickness of the original material after fixation to customize an equivalent reed plate thickness for each reed slot (reed) on the same reed plate without the need to select a compromised thickness to take into account all the reed slots like the traditional harmonica reed plate.

(2) The harmonica reed plate provided by the present invention is made by 3D processing of CNC, is a whole after processing instead of splicing, and has better air tightness.

(3) The harmonica provided by the present invention can realize the optimal vibration mode of bass and treble at the same time on one reed plate, and can control the deviation of timbre, volume and pitch, which is more conducive to playing.

In the figures: 1. reed plate; 2. reed slot; 3. groove; 4. reed.

DETAILED DESCRIPTION

The present invention will be further described below in combination with specific embodiments.

Embodiment 1

The present embodiment provides a harmonica reed plate.

Figure 1:
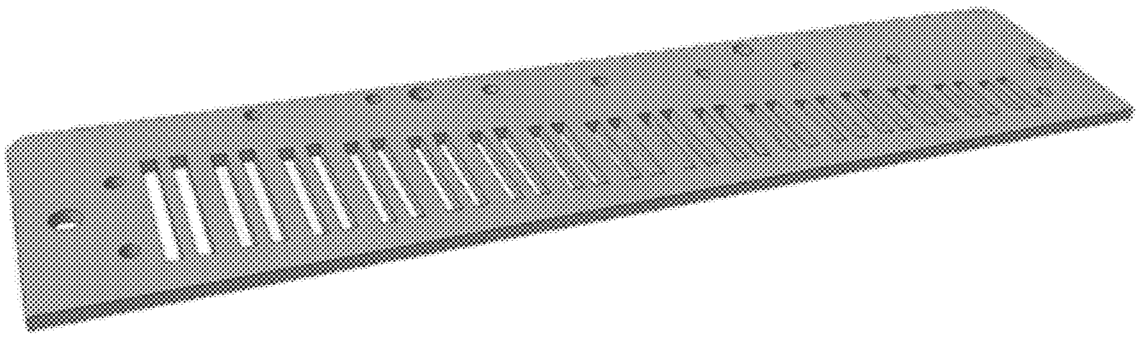
FIG. 1 is an existing harmonica reed plate style.
Figure 2:
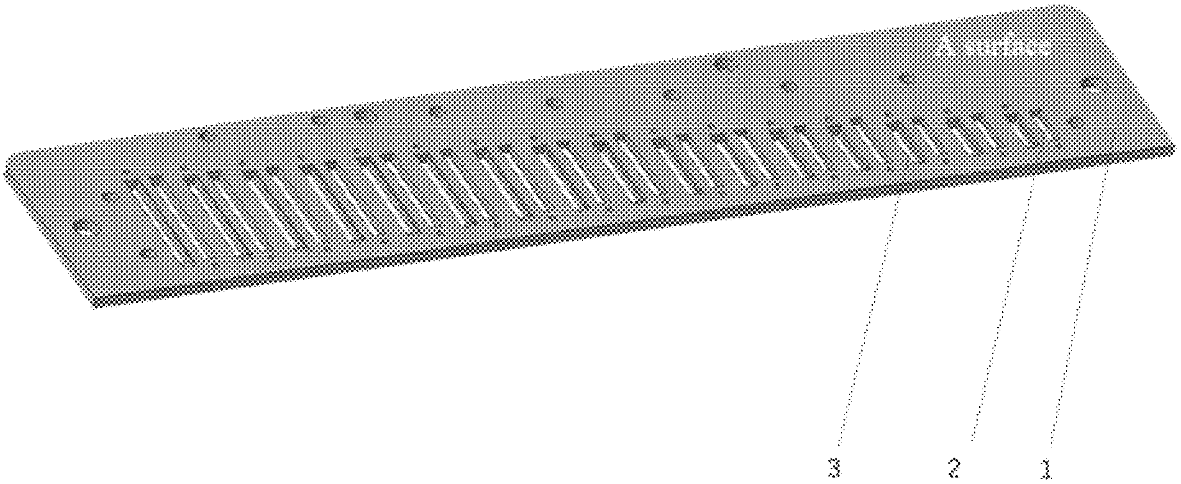
FIG. 2 is a harmonica reed plate style provided by embodiment 1.
Figure 3:
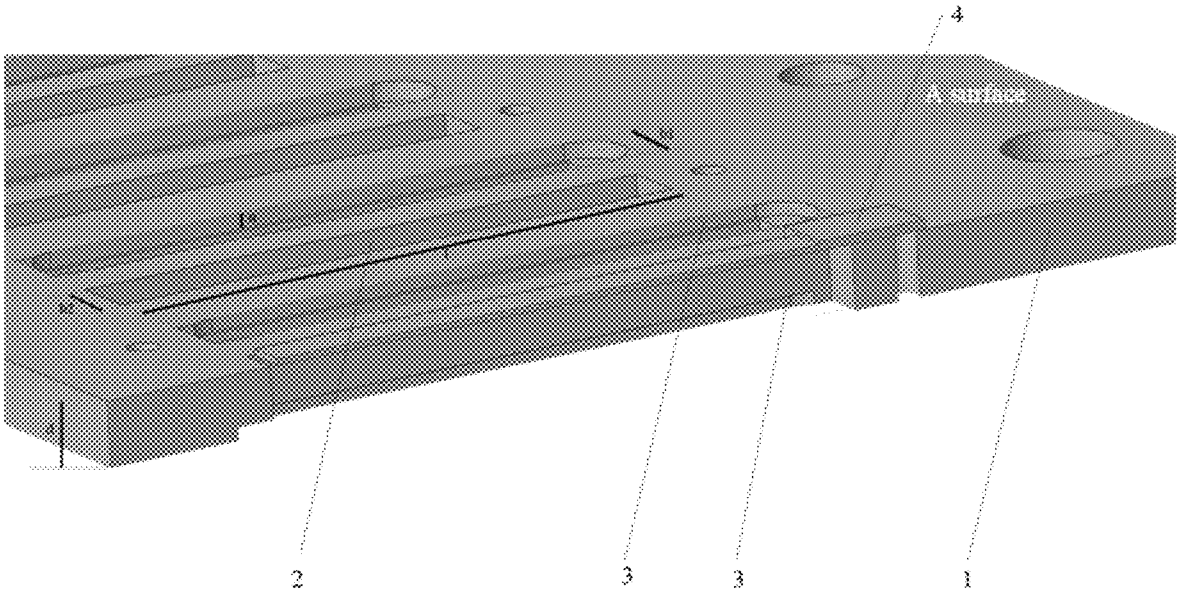
FIG. 3 is a cross-section schematic diagram of the harmonica reed plate provided by embodiment 1 after reeds are installed.

As shown in FIGS. 2-3, the harmonica reed plate has A surface and B surface. The B surface (not shown in the figure) is the other surface corresponding to the A surface. The harmonica reed plate 1 is provided with 32 reed slots 2 and 32 one-to-one corresponding grooves 3, and the reed slots 2 and the corresponding grooves 3 are respectively arranged on the A surface and the B surface of the reed plate. Specifically, the A surface is alternately provided with the reed slots 2 and the grooves 3 successively along the length direction of the reed plate 1; and the first reed slot 2 on the A surface of the reed plate is connected and perforated with the first groove 3 on B surface. Similarly, the groove on the A surface of the reed plate is connected and perforated with the reed slot on the B surface.

The 32 reed slots 2 are labeled as 1-32 respectively from left to right (i.e., from long to short), wherein the reed slots 2 labeled as odd numbers (i.e., 1, 3, 5 . . . 31) are arranged on the B surface, and the corresponding grooves 3 are arranged on the A surface; the reed slots 2 labeled as even numbers (i.e., 2, 4, 6 . . . 32) are arranged on the A surface, the corresponding grooves 3 are arranged on the B surface, and the longitudinal symmetric lines of the grooves 3 are overlapped with the longitudinal symmetric lines of the reed slots 2.

In the present embodiment, the reed plate thickness d=2.0 mm, and the parameters of each reed slot 2 and each groove 3 are as follows:

TABLE 1

Parameters of Harmonica Reed Plate (unit: mm)

| Reed Slot No. | Groove depth n | Reed Slot Length 1 | Groove Width b1 | Reed Slot Width b2 |
|---|---|---|---|---|
| 1/2 | 0 | 22 | 2.3 | 2.1 |
| 3/4 | 0.1 | 21 | 2.3 | 2.1 |
| 5/6 | 0.2 | 20.2 | 2.3 | 2.1 |
| 7/8 | 0.3 | 19.5 | 2.3 | 2.1 |
| 9/10 | 0.3 | 19.5 | 2.3 | 2.1 |
| 11/12 | 0.4 | 18.5 | 2.3 | 2.1 |
| 13/14 | 0.5 | 17.5 | 2.3 | 2.1 |
| 15/16 | 0.6 | 16.5 | 2.3 | 2.1 |
| 17/18 | 0.6 | 15.2 | 2.3 | 2.1 |
| 19/20 | 0.7 | 14 | 2.3 | 2.1 |
| 21/22 | 0.8 | 13.2 | 2.3 | 2.1 |
| 23/24 | 0.9 | 12 | 2.3 | 2.1 |
| 25/26 | 0.9 | 11 | 2.3 | 2.1 |
| 27/28 | 1.0 | 10 | 2.3 | 2.1 |
| 29/30 | 1.0 | 8.8 | 2.3 | 2.1 |
| 31/32 | 1.0 | 7.9 | 2.3 | 2.1 |

Embodiment 2

The present embodiment provides a harmonica reed plate.

The harmonica reed plate 1 has A surface and B surface and is provided with 24 reed slots 2 and 24 grooves 3 in one-to-one correspondence with the reed slots 2. The 24 reed slots 2 are labeled as 1-24 respectively from left to right (i.e., from long to short), wherein the reed slots 2 labeled as odd numbers (i.e., 1, 3, 5 . . . 23) are arranged on the B surface, and the corresponding grooves 3 are arranged on the A surface; the reed slots 2 labelled as even numbers (i.e., 2, 4, 6 . . . 24) are arranged on the A surface, the corresponding grooves 3 are arranged on the B surface, and the longitudinal symmetric lines of the grooves 3 are overlapped with the longitudinal symmetric lines of the reed slots 2. The reed plate thickness d=1.2 mm, and the parameters of each reed slot are as follows:

TABLE 2

Parameters of Harmonica Reed Plate (unit: mm)

| Reed Slot No. | Groove depth n | Reed Slot Length 1 | Groove Width b1 | Reed Slot Width b2 |
|---|---|---|---|---|
| 1/2 | 0 | 17 | 3.1 | 2.1 |
| 3/4 | 0.1 | 16.5 | 3.1 | 2.1 |

TABLE 2-continued

| Parameters of Harmonica Reed Plate (unit: mm) | | | | |
|---|---|---|---|---|
| Reed Slot No. | Groove depth n | Reed Slot Length 1 | Groove Width b1 | Reed Slot Width b2 |
| 5/6 | 0.2 | 15.8 | 2.3 | 2.1 |
| 7/8 | 0.3 | 14.2 | 2.3 | 2.1 |
| 9/10 | 0.3 | 14.2 | 2.3 | 2.1 |
| 11/12 | 0.4 | 13.9 | 2.3 | 2.1 |
| 13/14 | 0.5 | 13.5 | 2.3 | 2.1 |
| 15/16 | 0.6 | 12.9 | 2.3 | 2.1 |
| 17/18 | 0.6 | 12.5 | 2.3 | 2.1 |
| 19/20 | 0.7 | 10.9 | 2.3 | 2.1 |
| 21/22 | 0.8 | 9 | 2.2 | 2.1 |
| 23/24 | 0.8 | 8.8 | 2.2 | 2.1 |

Embodiment 3

The present embodiment provides a harmonica.

The harmonica provided by the present embodiment comprises a reed plate, reeds and grids. The reed plate is the reed plate in embodiment 1. The reeds with different lengths correspond to the reed slots with different lengths, and the reeds are fixed on the other surfaces of the grooves arranged on the reed plate by welding.

The above embodiments are only preferred embodiments of the present invention. It should be noted that, for those ordinary skilled in the art, several improvements and equivalent replacements may be made without departing from the principles of the present invention, and these technical solutions after improvements and equivalent replacements made to the claims of the present invention shall fall into the protection scope of the present invention.

What is claimed is:

1. A harmonica reed plate, wherein the harmonica reed plate (1) is provided with a plurality of reed slots (2) and a plurality of grooves (3) connected with the reed slots (2) and perforating the reed plate (1); the plurality of reed slots (2) are arranged alternately on an upper surface and a lower surface of the reed plate (1) successively along a length direction of the reed plate (1); the grooves (3) are arranged on back surfaces of the reed slots (2); and the width of the reed slots (2) is less than the width of the grooves (3).

2. The harmonica reed plate according to claim 1, wherein the length of the reed slots (2) is the same as the length of the grooves (3).

3. The harmonica reed plate according to claim 1, wherein the length of the reed slots (2) is less than the length of the grooves (3).

4. The harmonica reed plate according to claim 2, wherein the width of the reed slots (2) is less than the width of the grooves (3) by 0.1 to 1 mm.

5. The harmonica reed plate according to claim 3, wherein the width of the reed slots (2) is less than the width of the grooves (3) by 0.1 to 1 mm.

6. The harmonica reed plate according to claim 4, wherein the depth of the grooves (3) is increased gradually as the length of the reed slots (2) is decreased.

7. The harmonica reed plate according to claim 5, wherein the depth of the grooves (3) is increased gradually as the length of the reed slots (2) is decreased.

8. The harmonica reed plate according to claim 6, wherein the number of the reed slots (2) is 12, 24, 28 or 32.

9. The harmonica reed plate according to claim 8, wherein the number of the reed slots (2) is 32; the thickness of the reed plate (1) is 2.0 mm; the width of the reed slots (2) is 2.1 mm; the width of the grooves (3) is 2.3 mm; the lengths of the reed slots (2) are successively 22, 22, 21, 21, 20.2, 20.2, 19.5, 19.5, 19.5, 19.5, 18.5, 18.5, 17.5, 17.5, 16.5, 16.5, 15.2, 15.2, 14, 14, 13.2, 13.2, 12, 12, 11, 11, 10, 10, 8.8, 8.8, 7.9 and 7.9 mm; and the depths of the grooves (3) are successively 0, 0, 0.1, 0.1, 0.2, 0.2, 0.3, 0.3, 0.3, 0.3, 0.4, 0.4, 0.5, 0.5, 0.6, 0.6, 0.6, 0.7, 0.7, 0.8, 0.8, 0.9, 0.9, 0.9, 0.9, 1.0, 1.0, 1.0, 1.0, 1.0 and 1.0 mm.

10. A harmonica, adopting the harmonica reed plate of claim 1, further comprising reeds (4) and grids, wherein the reeds (4) correspond to the reed slots (2) and are fixed on one surface of the reed slots (2) arranged on the reed plate (1).

11. A harmonica, adopting the harmonica reed plate of claim 2, further comprising reeds (4) and grids, wherein the reeds (4) correspond to the reed slots (2) and are fixed on one surface of the reed slots (2) arranged on the reed plate (1).

12. A harmonica, adopting the harmonica reed plate of claim 3, further comprising reeds (4) and grids, wherein the reeds (4) correspond to the reed slots (2) and are fixed on one surface of the reed slots (2) arranged on the reed plate (1).

13. A harmonica, adopting the harmonica reed plate of claim 4, further comprising reeds (4) and grids, wherein the reeds (4) correspond to the reed slots (2) and are fixed on one surface of the reed slots (2) arranged on the reed plate (1).

14. A harmonica, adopting the harmonica reed plate of claim 5, further comprising reeds (4) and grids, wherein the reeds (4) correspond to the reed slots (2) and are fixed on one surface of the reed slots (2) arranged on the reed plate (1).

15. A harmonica, adopting the harmonica reed plate of claim 6, further comprising reeds (4) and grids, wherein the reeds (4) correspond to the reed slots (2) and are fixed on one surface of the reed slots (2) arranged on the reed plate (1).

16. A harmonica, adopting the harmonica reed plate of claim 7, further comprising reeds (4) and grids, wherein the reeds (4) correspond to the reed slots (2) and are fixed on one surface of the reed slots (2) arranged on the reed plate (1).

17. A harmonica, adopting the harmonica reed plate of claim 8, further comprising reeds (4) and grids, wherein the reeds (4) correspond to the reed slots (2) and are fixed on one surface of the reed slots (2) arranged on the reed plate (1).

18. A harmonica, adopting the harmonica reed plate of claim 9, further comprising reeds (4) and grids, wherein the reeds (4) correspond to the reed slots (2) and are fixed on one surface of the reed slots (2) arranged on the reed plate (1).

19. The harmonica according to claim 10, wherein the reeds (4) are fixed by welding, rivets or screws.

* * * * *